(12) United States Patent
Robinson

(10) Patent No.: US 6,796,504 B2
(45) Date of Patent: Sep. 28, 2004

(54) SYSTEM, APPARATUS AND METHOD FOR MARKING AND TRACKING BULK FLOWABLE MATERIAL

(76) Inventor: Martin C. Robinson, 2535 Tanager Dr. NE., Cedar Rapids, IA (US) 52402

( * ) Notice: Subject to any disclaimer, the term of this patent is extended or adjusted under 35 U.S.C. 154(b) by 223 days.

(21) Appl. No.: 09/681,065

(22) Filed: Dec. 15, 2000

(65) Prior Publication Data

US 2001/0029996 A1 Oct. 18, 2001

Related U.S. Application Data

(60) Provisional application No. 60/171,225, filed on Dec. 16, 1999.

(51) Int. Cl.[7] ............................................. G06K 15/00
(52) U.S. Cl. .................. 235/462.13; 235/375; 426/87; 700/115; 40/637
(58) Field of Search ................................. 235/375, 454, 235/462.01, 462.13, 470, 487, 494, 462.15; 702/2; 426/87, 132, 250, 231, 293; 700/115; 47/58.1 R; 106/2; 65/102; 252/408.1; 156/556; 408/705; 53/384.1; 40/637; 73/863.52

(56) References Cited

U.S. PATENT DOCUMENTS

| | | | |
|---|---|---|---|
| 4,296,409 A | 10/1981 | Whitaker et al. | 340/684 |
| 4,401,909 A | 8/1983 | Gorsek | 310/323.21 |
| 4,654,165 A * | 3/1987 | Eisenberg | 252/408.1 |
| 4,755,390 A * | 7/1988 | Calandro et al. | 426/293 |
| 4,803,626 A | 2/1989 | Bachman et al. | 701/50 |
| 4,818,850 A * | 4/1989 | Gombrich et al. | 235/494 |
| 4,843,561 A | 6/1989 | Larson | 364/478.01 |
| 5,282,389 A | 2/1994 | Faivre et al. | 73/861.73 |
| 5,327,708 A | 7/1994 | Gerrish | 56/1 |
| 5,338,344 A * | 8/1994 | Bondurant | 106/2 |
| 5,541,394 A * | 7/1996 | Kouchi et al. | 235/375 |
| 5,602,377 A * | 2/1997 | Beller et al. | 235/462.15 |
| 5,620,491 A * | 4/1997 | Puhl et al. | 65/102 |
| 5,664,402 A * | 9/1997 | Sandvik et al. | 53/384.1 |
| 5,776,713 A * | 7/1998 | Garner et al. | 435/7.92 |
| 5,845,229 A | 12/1998 | Rawlins | 702/2 |
| 5,849,140 A * | 12/1998 | Bilnoski, Jr. | 156/556 |
| 5,944,461 A * | 8/1999 | Kanbar | 408/705 |
| 5,956,255 A | 9/1999 | Flamme | 364/479 |
| 5,957,304 A | 9/1999 | Dawson | 209/552 |
| 5,961,573 A | 10/1999 | Hale et al. | 701/214 |

(List continued on next page.)

FOREIGN PATENT DOCUMENTS

| | | | |
|---|---|---|---|
| EP | 0 927 749 A1 * | 7/1999 | |
| JP | 10-180194 A * | 7/1998 | |
| WO | WO 99/04259 A1 * | 1/1999 | G01N/33/02 |

OTHER PUBLICATIONS

"Corn Oil and Protein Content," Crop Decisions, p. 14, Nov. 1999 (1 page).

(List continued on next page.)

*Primary Examiner*—Jared J. Fureman
(74) *Attorney, Agent, or Firm*—Simmons, Perrine, Albright & Ellwood, P.L.C.

(57) ABSTRACT

A method and apparatus are disclosed for identifying a characteristic of a bulk flowable material. An identification marker is inserted into a bulk flowable material. The identification marker carries information identifying a specified property or properties of the material. A marker dispenser can be located at one or more handling sites of the bulk flowable material. The identification markers can be pre-prepared or property-related information can be added to the marker prior to or subsequent to dispensing. The identification markers can be paper-like labels, for example, or more complex devices. The system can be used to track the lifespan of a material or to indicate a property of the material to others, such as whether the material is a genetically modified organism (GMO). A pre-printed marker source containing a single continuous bar code is also disclosed.

210 Claims, 9 Drawing Sheets

U.S. PATENT DOCUMENTS

| | | | | |
|---|---|---|---|---|
| 5,978,720 | A | | 11/1999 | Hieronymus et al. ......... 701/29 |
| 5,978,723 | A | | 11/1999 | Hale et al. .................... 701/50 |
| 6,068,981 | A | * | 5/2000 | Rittenburg et al. .......... 435/7.1 |
| 6,119,531 | A | * | 9/2000 | Wendte et al. ........... 73/863.52 |
| 6,200,610 | B1 | * | 3/2001 | Graham ....................... 426/87 |
| 6,279,255 | B1 | * | 8/2001 | Larsen ........................ 40/637 |
| 6,406,725 | B1 | * | 6/2002 | Taylor ......................... 426/87 |
| 2001/0011437 | A1 | * | 8/2001 | Shortridge et al. .......... 47/58.1 |
| 2003/0009254 | A1 | * | 1/2003 | Carlson et al. ............. 700/115 |

OTHER PUBLICATIONS

"Strategic Diagnostics Significantly Expands Market Reach for Its Trait Check Crop Test," Company Press Release, Nov. 29, 1999 (2 pages).

"What Is Cropgard?," http//www.cropgard.com/Information.htm (date unknown) (1 page).

"Sensitive GMO Detection Technology Available," http://www.grainnet.com/ArticleLibrary/articles.html, posted Sep. 14, 1999 (2 pages).

"Tracking crop easily done: system developer," The Western Producer, http://www.producer.com/articles/20000601/news/20000601news06.html, Jun. 1, 2000 (2 pages).

"Protect Your Crop Even When You Think It's Safe," Canola Country Newsletter, pp. 5–6, http://www.canola-council.org/orgs/scga/0299.htm, Feb. 1999 (6 pages).

"Agricultural Information Technologies formally announces of its new POSTMARK Field Identification System," http://www.agriculture.com/subscribe/basic/aginn/newswrap/1997/11_97.html, Nov. 20, 1997 (2 pages).

"RFID Coal Tracking Technology," Transponder News, Deryck Lauf, http://www.rapidttp.com/transponder/tcoalsrt.html, date likely between May 2000 and Dec. 2000 (3 pages).

* cited by examiner

SYSTEM, APPARATUS AND METHOD FOR MARKING AND TRACKING BULK FLOWABLE MATERIAL

CROSS REFERENCE TO RELATED APPLICATION

This application claims the benefit of U.S. Provisional Application No. 60/171,225, filed Dec. 16, 1999.

BACKGROUND OF THE INVENTION

In the past, identification of bulk flowable materials was accomplished by visual identification. Subtle distinctions, involving traits not readily visible to the human senses, were generally not drawn. Today, however, handlers of bulk flowable materials are increasingly being called upon to make fine distinctions related to the materials they are handling. Consequently, there exists a need to provide ready identification of a material's specific trait or traits to those responsible for storing, transporting, processing or otherwise handling the material.

The treatment traditionally given agricultural crops provides one example of the types of practices applicable to bulk flowable materials in general. Previously, intermingling of different varieties of a crop, such as a crop of corn for example, was commonplace in elevators and storage facilities. For example, many different varieties of corn would be accumulated, stored and transported together as one commodity. Each variety was treated as being equivalent to each of the other varieties. There was no need to segregate the varieties to maintain a purity standard or for some other purpose.

Recently, however, the differences between the varieties of a single crop type, for example corn or soybeans, have become significant. In addition, the number of different varieties continue to increase. As a result, a need to identify and segregate the varieties from each other has arisen.

For example, the creation and expanding use of genetically modified organisms (GMOs) have created many significant identification, tracking and segregation issues. Consumer opposition to the inclusion of such crops into the food and processing stream is evident in many countries. For example, Roundup Ready corn varieties, which are widely grown in the United States, have been prohibited from import into the European Community.

Further, economic factors also contribute to the need to identify, track and segregate. Due to the consumer opposition to GMOs, premium prices may be paid for crops that can be demonstrated to be non-GMO crops. In addition, some of the developed varieties have differences significant enough to command a premium price. For example, a high oil corn has been developed that has a higher oil content than "commodity" corn. The higher oil content makes high oil corn a superior product for some applications, such as feed or processing. As a result, a higher price can be obtained for this product.

Crops with genetic modifications or specific traits are often visually indistinguishable from one another. They are also indistinguishable from crops that do not contain the various modifications or traits. Analysis of varying complexity can be performed, using chemical solvents or infrared spectrum photometry for example, to identify a given sample. These tests are performed at a point of transfer, such as at the time of sale, to identify the material being sold.

The testing procedure, however, is time consuming and it disrupts the flow of the material through the processing points. Further, even if a sub-sample has been tested and identified, portions of the remaining lot of the material may have a trait different from that of the sub-sample tested. In addition, current testing practice involves delaying a shipment or truckload of the crop until the testing is complete.

In order to avoid the testing procedure, several handlers use a verification procedure. After testing, the crop is transferred to a holding bin designated for crops of that particular trait or class of traits. Current verification practice entails the signing of a statement by the crop provider or producer that verifies the genetic origin of the crop. The usefulness and accuracy of this system depends in large measure on the truthfulness and accuracy of the verifier. Further, if at any subsequent point, the crop is intermingled with other varieties, the value of the identification will be lost and, if further testing is not performed, uncertainty will be present at each subsequent stage of handling.

Consequently, there exists a need for improved systems, methods and apparatuses for identifying various properties of bulk flowable materials, and in addition, for readily and sufficiently identifying such material at subsequent stages of handling or processing.

SUMMARY OF THE INVENTION

It is an object of the present invention to provide an apparatus and method for identifying a property of a bulk flowable material.

It is a feature of the present invention to utilize a marker to identify a characteristic of a bulk flowable material.

It is an advantage of the present invention to enable a particular bulk flowable material to be identified from a plurality of similar but different bulk materials at one or more stages of its handling.

It is another object of the present invention to provide a marker dispenser apparatus capable of dispensing a marker into or onto a bulk flowable material.

It is another feature to utilize a marker dispenser that is located proximate a moving flow of bulk flowable material.

It is another advantage of the present invention to provide ready and automatic marking of a bulk flowable material at one or more stages of handling.

It is yet another object of the present invention to provide a marker media for marking a bulk flowable material.

It is yet another feature to utilize a spool of marker media containing a length of bar code-style indicia that can be clipped off at any point for dispensing a bulk flowable material.

It is yet another advantage of the present invention to provide an inexpensive, accurate and reliable manner of providing a marker for a bulk flowable material.

The present invention is a system for marking a bulk flowable material, for example a harvested crop, for later identification. Further, the method and components of the invention permit it to be implemented in a cost effective and, if desired, an at least partially automated manner. The system is useful, for example, for identifying a property of the bulk material that is not otherwise readily apparent.

The invention can also be used to mark a bulk flowable material that may later be located proximate other collected bulk flowable materials. For instance, the system can be used to identify a crop, such as a genetically modified organism or a specific variety, held in a container with crops that are not genetically modified organisms or that are of a different variety. The marked crop can be distinguished from the other crops and the information can be used to separate the marked crop from the other held crops if desired. Further, the identifying information travels with the material it is marking and is available to handlers of the material at later processing, trading or handling stages.

Accordingly, the present invention provides a system for identifying a property of a bulk flowable material.

BRIEF DESCRIPTION OF THE DRAWINGS

The invention may be more fully understood by reading the following description of the embodiments of the invention, in conjunction with the appended drawings, wherein.

DETAILED DESCRIPTION

Figure 1:
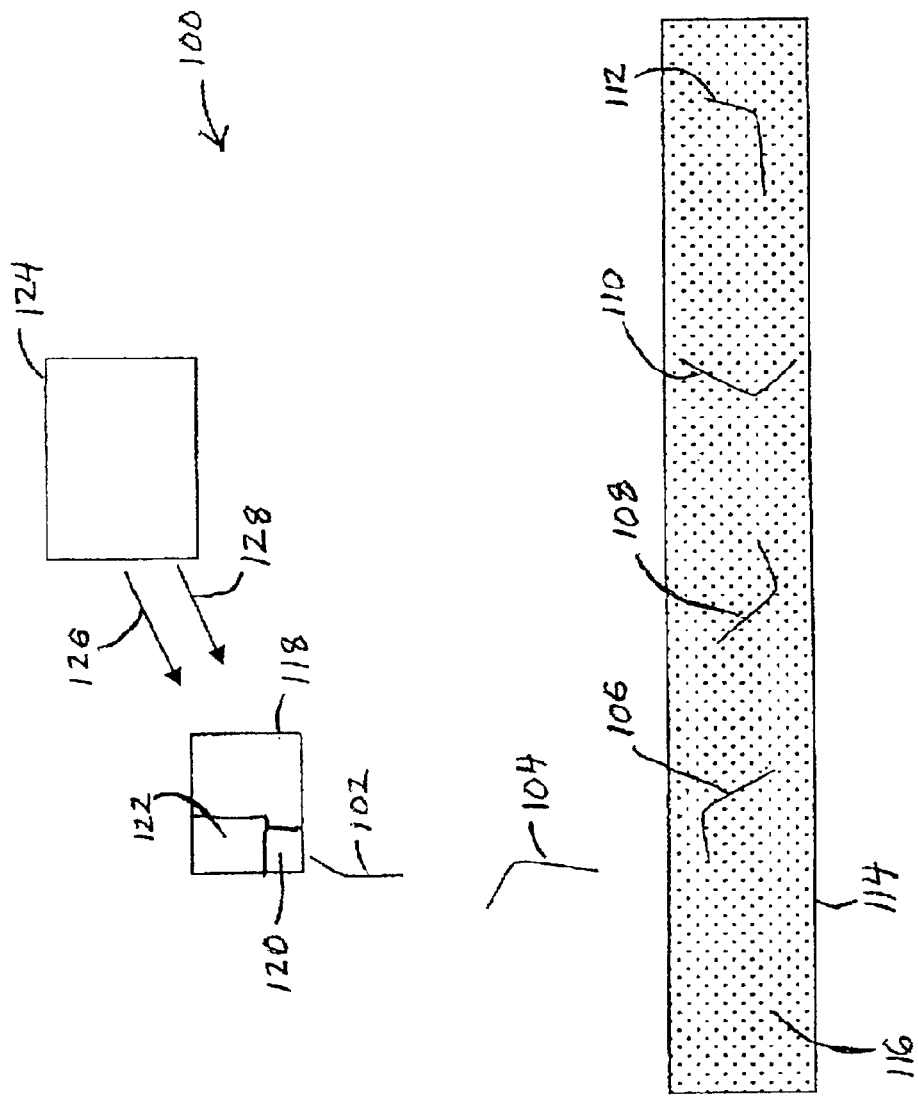
FIG. 1 depicts an embodiment of the marker dispensing system of the present invention.

Now referring to the drawings, wherein like numerals refer to like matter throughout, there is shown in FIG. 1 an embodiment of a marker dispenser system 100 designed in accord with the teachings of the present invention. FIG. 1 depicts a plurality of identification markers 102, 104, 106, 108, 110, 112 being added to a moving stream 114 of bulk flowable material 116. The markers 102, 104, 106, 108, 110, 112 are being distributed by a dispenser unit 118. The dispenser unit 118 includes a marker media feeding component 120. In one embodiment, the dispenser unit 118 includes a marker preparation component 122 in addition to the feeding component 120. Also depicted, is a signal generation unit 124 capable of providing control signals 126, 128 to the dispenser unit 118.

As will be appreciated, the identification marker dispensing system 100 of the present invention can be beneficially used in a wide variety of applications and in conjunction with a wide variety of different bulk flowable materials 116. The present invention will be described herein primarily in connection with an agricultural application involving a material such as corn or soybeans. The invention, however, is not to be limited to agricultural applications. The teachings also apply to non-agricultural applications and to a wide variety of agricultural and non-agricultural bulk flowable materials.

In the agricultural or horticultural context, the identification marker dispensing system 100 can be used at one or more of several different handling stages. For example, the system of FIG. 1 may be a located in a harvester apparatus, such as a combine; the identification markers being placed into the crop stream at the time of harvesting. By way of further example, the identification marker dispensing system 100 can be used during a stage of seed conditioning or processing, during application of treatments such as pesticides or fertilizers, during the transfer of the bulk flowable material to a storage or other container (see FIGS. 3 and 4), or during any of several other processing or handling stages. Another use of the system, which will be discussed in further detail below, involves marking a property of a seed at, or prior to, the time of planting the seed.

Several different types of structures or devices can be used for the identification markers 102, 104, 106, 108, 110, 112. They can be intelligent devices or unintelligent media. For example, the identification markers 102, 104, 106, 108, 110, 112 can be simple physical markers, markers containing optically-readable information, devices including a memory component, devices capable of communication via radiant energy signals or devices including one or more sensing components. In addition, some applications may employ more than one type of identification marker 102, 104, 106, 108, 110, 112 in the marker dispensing system 100. The specifics of the application at hand will influence the choice of which type of identification marker to employ.

The simple physical marker, for example, can be a marker having a specified shape, design or color. This type of marker can be made of any of a wide variety of materials. It can be made of a paper or paper-like material, cardboard, plastic, rubber, metal, fiber or other such material or materials. The marker may be designed to be durable, with the potential for reuse, or semi-durable. A semi-durable marker can have a tailored rate of degradation or can be designed to degrade when exposed to a specific substance. Consequently, semi-durable markers can provide the added advantage of easy, even automatic, removal from the bulk flowable material at the desired time or stage.

In one embodiment, information concerning a property of the bulk flowable material is communicated as a function of the color of the marker. For example, a red colored marker would indicate one trait, such as a GMO material, and a blue colored marker would indicate another trait, such as a non-GMO material. In a related embodiment, the lack of any marker in the material indicates the presence or absence of a given property. Further, several different color codes can be used for a crop handling system dealing with a large number of tracked properties or characteristics. The sizes and colors of the marker can be chosen based upon the ability to be readily identified and distinguished from the accompanying bulk flowable material being marked. The size and color characteristics can also be chosen so as to promote ready removal of the marker at a subsequent stage.

The shape-coded marker functions similarly to the color-coded marker. Markers having one shape or design are used to indicate a given property of the bulk flowable material. Other shapes or designs are used to indicate other properties. The shape and size of the identification marker can be chosen to promote marker identification, removal or both.

The markers containing optically-readable indicia may be human-readable, machine-readable or both. The human-readable marker includes alpha-numeric characters or graphical designs. This type of marker can also be machine readable. For example, it can be scanned or imaged by an optical reader device having optical character reading (OCR) or other such capabilities.

A machine-readable marker can have optical indicia that is readable only by an optical reader device or magnetic indicia readable by a magnetic reader unit. For example, a machine-readable marker having optical indicia may contain a standard one-dimensional bar code or one of the well-known two-dimensional optical codes. There currently exist a wide variety of such codes having a range of sizes, densities, capacities and styles.

In other embodiments, the identification marker 102, 104, 106, 108, 110, 112 is a more complex, intelligent device. In one embodiment, the identification marker is an electronic identification component capable of storing data and communicating via radiant energy. For example, the identification marker can be a radio frequency identification (RFID) tag. RFID tags are currently available in large quantities and at reasonable prices. Some types of RFID tags store information that can only be read and not changed. Other types of RFID tags are writeable and additions or changes can be readily made to the stored data. In one embodiment of the invention, the tag remains in a dormant mode until activated by a predetermined signal or condition. In addition, several types and styles of hand-held and stationary RFID tag readers are available.

In another embodiment, an intelligent marker contains a sensor component. The sensor component is designed to sense one or more properties of an accompanying bulk flowable material. The identification marker 102, 104, 106, 108, 110, 112 then stores data representing the property sensed or representing the absence of the property. The identifying information need not be predetermined and applied to this type of identification marker. The marker identifies and records the property or properties automatically, after being introduced into the bulk flowable material.

Further, the marker can be a structure composed of a combination of two or more physical components. At least one of the components is utilized for its ability to minimize migration of the marker through the bulk flowable material. This component can be chosen to be of a material, size, shape, weight or density appropriate to limit propagation of the marker in the anticipated bulk flowable material. The identifying information can be carried by one or more other components of the marker. Thus, the marker can be designed to limit its movement, due to wind or other influences for example, away from its accompanying bulk flowable material. As a result, the marker can even more clearly and accurately indicate the boundaries or presence of its accompanying bulk flowable material.

In yet another embodiment, an identifier is deposited or placed directly on the surfaces of a portion of the bulk flowable material. In this embodiment, information concerning a property is communicated without requiring the addition of a foreign media, such as a tag or other such marker substrate, to the bulk flowable material. Instead, the information is carried on the bulk flowable material itself.

For example, a chemical marker or a color marker, such as a powder or liquid dye, is sprayed, sifted or otherwise applied to some portion, or all, of a bulk flowable material having the trait being identified. In applications wherein it is necessary to remove the marking material at some subsequent stage of processing, when the material is to be used for food for example, a marking agent with special properties can be used. For example, a marking substance that is water soluble, biodegradable, consumable or otherwise easily removed can be used. Depending on the application, soy or vegetable-based inks or dyes can be used.

The identification markers 102, 104, 106, 108, 110, 112 can be used to communicate information relating to many different properties of the accompanying bulk flowable material. In the context of agricultural crops, the properties tracked and identified include crop variety type, classification as a GMO, crop quality traits, geographic location of the field of planting, geographic location of the field or location of harvest, crop ownership, crop producer, crop caretaker, crop handler, crop treatment or any other information useful for identification, segregation or marking purposes. The crop quality property may be a trait that has been pre-identified, for example by a supplier of the seed from which the crop was created.

Alternatively, the quality properties may be traits that are identified or analyzed during processing, harvesting or other handling concurrent with, or just prior to, the dispensing of the marker. The crop handler can be, for example, an entity that plants, grows, treats, harvests, transfers, stores, processes or otherwise handles the crop lot. The crop treatment information can track, for example, pesticide, herbicide, fertilizer or other applications. The identification marker can be designed to communicate information regarding one or more of the relevant properties as demanded by the application at hand.

The identification markers disclosed above can be used singly, or in combination, in the several applications described through this specification, as well as in the many related applications that flow naturally therefrom. For example, some embodiments dispense markers containing visually or optically readable information, and more complex electronic style markers, such as RFID markers, into the same lot of bulk flowable material. Further, the markers of the present invention can be pre-printed or ready made so that at the time of introduction they need merely be inserted into the bulk flowable material. The marker can be pre-printed with a bar code or other optical information, it can be a pre-shaped or pre-colored marker, or it can be a pre-configured intelligent marker such as an RFID tag with pre-stored identification data.

In one embodiment, markers are provided to the user by an entity that provides the seed for a crop. For example, a seed supplier can include RFID tags in the bags of seed purchased by growers. The tags can contain data identifying the source of the seed, date information, variety information, genetic information and so forth. Various combinations of such information will be useful in the various applications. The tags can also indicate acceptable, anticipated or required seed treatment information. This information can include, for example, specific or general pesticide, herbicide or fertilizer treatment information as well as specific information regarding scheduling, quantities, strength, etc.

The RFID tags, or other identification markers with communication capabilities, are deposited onto or into the ground at the time of planting. Later, a reader unit, for example a hand-held unit carried by a grower or a unit mounted in a vehicle, tractor or harvesting machine accesses the data. Further, if the markers are writeable, information concerning the treatment applied or other action taken can be recorded on the tag as the reading and writing unit passes nearby. Thus, a record can be developed for a lot of a particular material, for example a field of soybeans.

At various stages, for example at harvest, the data in the markers can be downloaded, for example to a reader unit in a harvesting machine. The data can provide a growing history of the crop. The gathered data can then be rewritten onto one or more of the marker types disclosed throughout this specification, which can then be inserted into the harvested material for further tracking and use. Further, when combined with information identifying the field location, such as a GPS location reading, a yearly historical record of the use of a particular field can be generated. This is useful, for example, in showing that the field has been used only for non-GMO crops for a given number of years.

Although the identification markers 102, 104, 106, 108, 110, 112 of FIG. 1 are depicted as bent strips, such as bendable paper labels, the identification marker chosen for a given application will have a form suited to that application. For example, an RFID tag marker can be a flat, non-bendable object. It will be appreciated that various other marker forms and styles will be appropriate for the various marker types disclosed. The shape of the markers depicted in FIG. 1 is not intended to limiting.

Referring still to FIG. 1, there is depicted a moving stream 114 of bulk flowable material 116. The material 116 is moving from left to right as one views FIG. 1. Thus, identification marker 112 was dispensed into the stream prior to the other depicted identification markers and it has traveled a distance with its associated bulk flowable material. The stream of material 114 can be on, for example, a conveyor apparatus or it may be propelled through a passage or tube by means of air pressure, gravity or some other movement inducing force. Further, although a linear, stream-like movement is depicted in FIG. 1, the invention is also intended to include other types of material movement as well. For example, identification markers 102, 104, 106, 108, 110, 112 can also be dispensed onto a bulk flowable material 116 that is moving in a curved, arched or circular fashion or onto a material that is being stirred.

The dispenser unit 118 dispenses the identification markers 102, 104, 106, 108, 110, 112 into the bulk flowable material. The main function of the dispenser unit 118 is to store a quantity of marker media and to dispense the identification markers at the proper time via the marker media feeding component 120. When the application uses only pre-prepared identification markers, pre-printed labels for example, the dispenser unit 118 need not include a marker preparation component 122. When some information must be added to the identification marker just prior to dispensing, however, the marker preparation component 122 can be included in the dispensing unit 118. In one embodiment, the marker preparation component can be, a printing device such as an ink jet, thermal or other such printer, capable of adding the appropriate information to the marker.

When more sophisticated marking media, for example an RFID marker, is used, the marker preparation component 122 is a device appropriate for communicating with the more sophisticated marker. For an embodiment using an RFID marker, the marker preparation component 122 can be integrated with the dispenser unit 118 or it can be a separate component located elsewhere. In one embodiment, the separately located marker preparation component communicates directly with the identification markers without communicating with the dispensing unit 118.

The signal generation unit 124 can be a separate component, as indicated in FIG. 1, or it can be integrated with the dispensing unit 118. The signal generation unit 124 provides control signals 126, 128 that govern the dispensing of the identification markers by the dispensing unit 118 and, in an embodiment not using pre-prepared markers, the property-related information to be added to the identification marker by the marker preparation component 122. In other embodiments, the signal generation unit 124 provides more than two forms of information to the dispenser unit 118.

The dispensing control signal 126 determines the rate at which the identification markers are dispensed. In one embodiment, the rate is purely a function of time. In this embodiment, the signal generation unit 124 can include a simple timer for generating the signal. At each time interval, one or more identification markers are dispensed into the bulk flowable material. The length of the time interval and the number of markers to be released at each interval can be determined in a variety of ways. An operator can manually enter the values either before or during the dispensing process, the values can be determined automatically based on one or more of a variety of inputs, or the values may be entirely predetermined.

For example, the operator may manually set the values based on one or more observed conditions such as the type of bulk material, the amount of material, the size of the material, the expected land speed of a harvester apparatus, the real-time land speed of a harvester apparatus, the type of marker being dispensed, the requirements of subsequent handlers of the material, or other factors. The same factors can also be used as inputs by a system that automatically determines the values to be communicated. In one embodiment, RFID markers that had been dispensed with seed at the time of planting provide the values. In this type of embodiment, the seed supplier can determine and set the value or values. In another embodiment, the operator can manually direct the release of a marker by manually activating a switch or other such triggering mechanism whenever release of a marker is desired.

Figure 2:
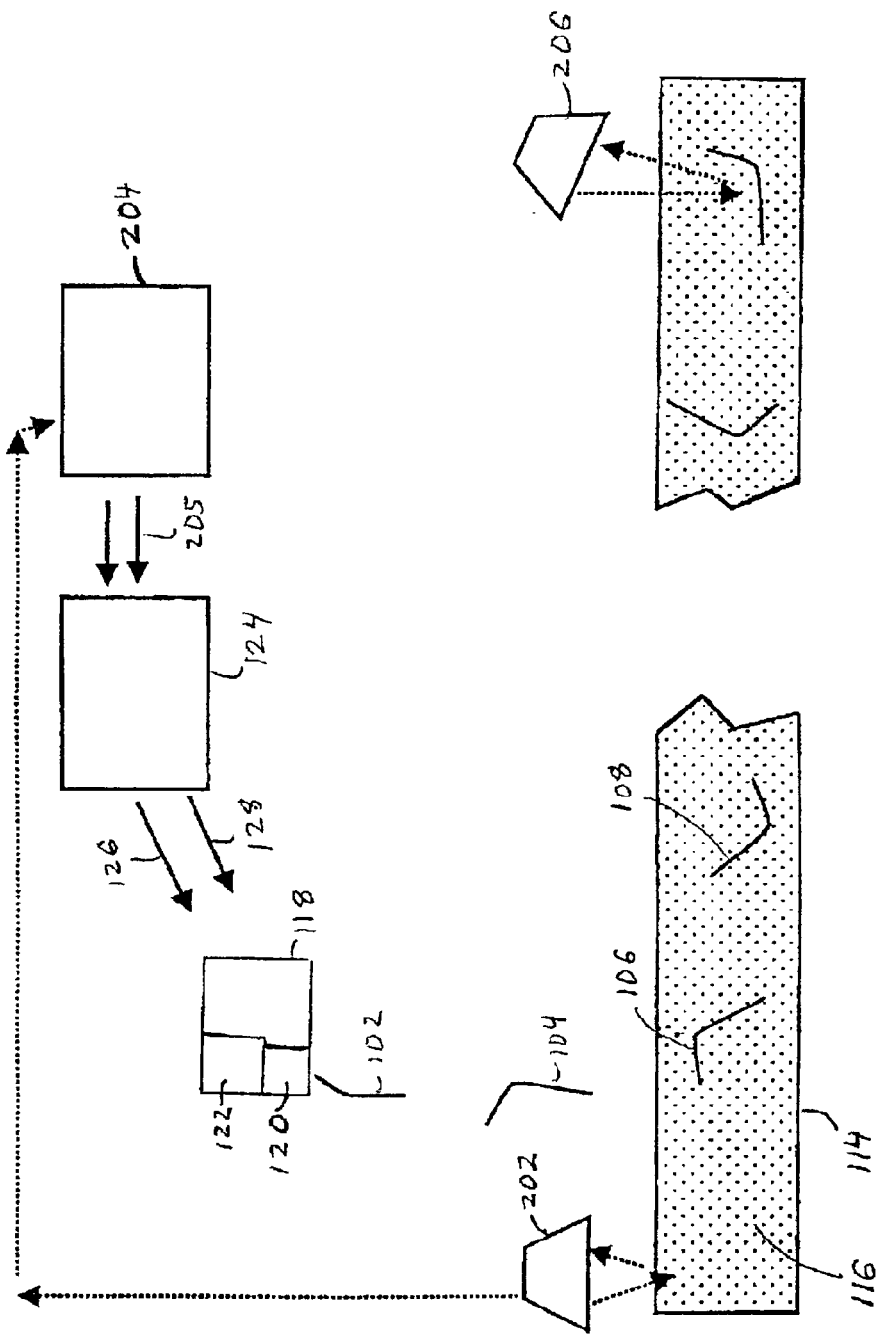
FIG. 2 depicts an embodiment of the marker dispensing system of the present invention that includes sensor and reading components.

In another embodiment, the rate of dispensing is automatically set not as a function of time but as a function of the volume of bulk flowable material being processed within a given time period. For example, a sensor can determine the volume passing a given point during a given time interval and can communicate this information to the marker media feeding component 120. The dispensing unit 118 will release a given number of markers per unit of volume as desired for the application at hand. In one embodiment, for example, the dispensing unit 118 releases one identification marker for each ten bushels of material processed. In other embodiments, units of weight, mass, length, width or some other measurement is used to determine when a marker or markers should be dispensed. In one embodiment, the volume sensor is located in a harvester apparatus. In other embodiments, the sensor is located near or on some other type of bulk material transporting or conveying apparatus. FIG. 2 depicts a marker dispenser system having a sensor component.

In another, more complex embodiment, the dispensing signal 126 is generated from a combination of manually entered and sensed data. In yet another embodiment, the dispensing signal 126 is generated from a different combination of inputs. For example, the dispensing signal 126 can result from an algorithmic combination of manually input and predetermined data, or of manually input and automatically determined data, or of automatically determined and sensed data or some other useful combination of inputs.

The dispensing signal 126 can also be a function of a later-stage purity requirement. For example, if a later handler needs to guarantee that a given percentage of the bulk flowable material has a given trait, for example that 95% of a grain is non-GMO grain, a determined number of markers can be added per unit of material at a harvesting or other such prior stage to help ensure that the percentage is can be demonstrated. For example, one marker per bushel provides better tracking and routing capabilities than would a concentration of one marker per ten bushels.

The property signal 128 communicates the property information that is to be added to each identification marker. The property information is what identifies the material's trait or traits to other handlers and interested parties. As with the dispensing signal 126, the property signal can be generated from one or more of a variety of inputs. The information may be predetermined, automatically determined or manually input. For example, in various embodiments, a handler can input the information by keyboard, voice command or other input device. A device, for example an RFID marker or a sensor that determines the presence or absence of a property in real time, can automatically determine and communicate the information to the signal generation unit 124. Other embodiments use various different combinations of such inputs to determine the content of the property signal 128.

The control signals 126, 128 themselves can be electrical signals sent by wire or other conductive cable. In other embodiments, the control signals 126, 128 are light energy signals communicated via fiber optic cable. In yet other embodiments, the control signals 126, 128 are radiant energy signals such as infrared or radio frequency signals capable of propagating wirelessly.

The property information communicated by the identification markers can be used in a variety of ways. For example, the bulk flowable material may be transferred or diverted to a specific storage area or processing stream based on the stored property information. In one embodiment, the property information is used to segregate GMO from non-GMO materials. It can also be used to dictate the type of treatment a harvested or unharvested crop is to receive.

The property information on a marker can be read by manually reading or inspecting the markers accompanying the bulk material. Reading may also be accomplished automatically by a reader unit that automatically reads the property information and then signals associated machinery, such as a conveyor, gates, or sprayers to divert, transfer or treat the material as appropriate given the read property or properties. For example, an RFID marker reader reads RFID markers traveling in a stream of harvested crop and sends signals to machinery or human operators that govern the path to be taken by the crop material or the treatment to be applied to that material.

As noted, property information can be used to provide verification or identification of application of a specialized treatment, for example a chemical treatment such as a pesticide, fertilizer or herbicide, to the material. In other embodiments, property information concerning items such as identity or quality is downloaded or transferred from the marker and is stored in a computerized or some other database for future retrieval, tracking and statistical purposes. In some embodiments, the information is used by seed companies or contract seed providers for inventory or production tracking purposes.

In yet another embodiment, the production level of a material lot, a field for example, is quantified by counting and calibrating the markers contained therein. For example, knowledge that the markers were distributed at the rate of one marker per ten bushels can be used to determine the total number of bushels in a given shipment. In this embodiment, the marker reading device need only be capable of counting the markers contained in the lot.

At some point, it may become necessary to remove the identification markers from the bulk flowable material. For example, this may be required for materials destined for use as food by animals or humans. Various methods of removal can be used. The choice of removal method will be dependent on the characteristics of the identification marker being removed. Lighter markers, such as paper labels that are of significantly lighter weight than the accompanying bulk flowable material, can be removed by application of an air stream to the bulk material. Soluble markers can be removed by the application of water or some other suitable solvent. Magnetic forces can be used to remove markers having metallic components. Larger markers can be removed by filters that allow the bulk flowable material to pass but skim off or otherwise remove the marker. Other methods of removal are also available.

In some embodiments, the marker is made of consumable materials. For example, the marker substrate can be made of a consumable paper-like material and the property information can be applied to it via a consumable ink, for example a vegetable or soy-based ink.

In other embodiments, the identification markers are made from biodegradable materials. Biodegradable markers would not have to be removed from the bulk material. They would naturally break down over time.

One system of use involving the present invention is envisioned as described in this and the following two paragraphs. At or prior to the time of planting, coding information is provided by the seed company or the owner of a contract crop production from which the crop variety or seed lot originated. Subsequent operations in the field, such as fertilizer, pesticide or herbicide applications, are recorded electronically by technology presently available, generally referred to as site-specific technology. At harvest or other points of handling, the previously recorded information is transferred to identification markers. This permits the recorded information to physically travel with the crop during subsequent handling and processing.

The site-specific technology can be used as a quality or compliance control tool so that only appropriate operations are allowed. For example, at planting, the crop variety information can be read into the planter monitor. As the crop is planted, information is recorded regarding the specific variety being planted into the field boundaries. At a subsequent step such as pesticide application, a sprayer operator must access the previously recorded crop variety information and coordinate such with the pesticide about to be sprayed. The chosen pesticide application is recorded into a common database relating to the field boundaries. The pesticide application may even be allowed or not allowed based on pre-determined compatibility with the crop variety or on legal compliance issues.

The crop harvester electronic modules can be programmed such that they cannot be overridden, thus ensuring proper marking of crops and treatments. In other words, an operator would be prevented from misidentifying the crop variety, treatment or other information. Eventually, all such information is recorded into a common database relating to the field boundaries, including dates of application, materials used, etc., and can be transferred to identification markers at the time of harvest.

Now referring to FIG. 2, there is shown an identification marker dispensing system 200 similar to that of FIG. 1. The teachings related to FIG. 1 are also applicable to FIG. 2. The system 200 of FIG. 2 depicts an embodiment including sensing and reading systems. The sensing system of this embodiment comprises a sensor unit 202 and a processor unit 204. In a different embodiment, the sensor unit 202 and processor unit 204 are integrated into a single unit. In yet another embodiment, the signal generation unit 124 and the sensor unit 204 are integrated in a single unit.

The sensor unit 202 detects a given property, such as volume, weight, speed, number, or crop variety, etc., of the bulk flowable material 116 and generates a signal related thereto that is sent to the processor unit 204. The processor unit 204 decodes and processes the signal and, if necessary, combines it with other information as described above. Next, the processor unit 204 generates dispensing or property-related information that is passed 205 to the signal generation unit 124.

The processor unit 204 may also be coupled with a global positioning system or other such positioning system to enable the processor unit 204 to relate sensed, input or predetermined information to the location of the bulk flowable material. The location information can be passed to the identification marker via the signal generating unit 124. As noted above, inclusion of location data can permit a historical record of a given field or area to be created.

FIG. 2 also depicts a reader unit 206. As noted above, the reader unit 206 senses the presence of the identification marker, reads the information associated with the marker, or performs both functions. The reader unit 206 will generally be in communication with a processing system other than the processor unit 204. Generally, the reading operation will be performed at a time and location significantly removed from the marker dispensing operation. For example, in one embodiment, the marker is dispensed at a growing location at the time of harvest and is not read until after the bulk flowable material is removed from a storage facility location several months later.

Figure 3:
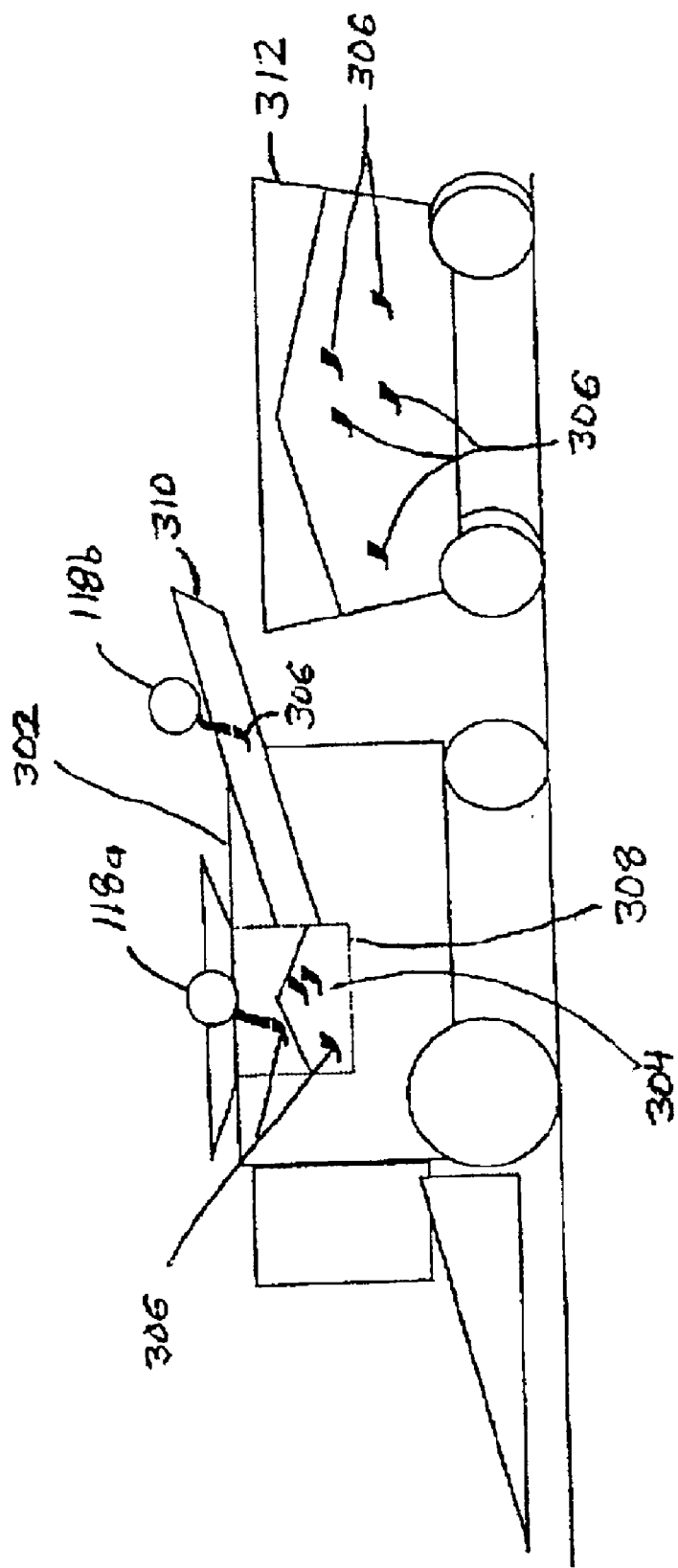
FIG. 3 is a graphical depiction of a harvesting-stage embodiment of the marker dispensing system of the present invention.

FIG. 3 illustrates an agriculture-based use of the identification marker dispensing system. FIG. 3 depicts a harvesting vehicle 302 such as a combine that has harvested a quantity of grain 304. The grain 304 has a plurality of identification markers 306 mixed therewith.

In one embodiment, a dispensing unit and any required associated components, for example the processing, sensing, GPS and other components discussed throughout this specification, are located on the harvesting vehicle 302. The dispensing unit can be located proximate a grain storage compartment 308 of the harvesting vehicle 302. The dispensing unit 118a depicted in FIG. 3 is positioned to deliver an identification marker 306 to a stream of grain as it enters the grain storage compartment 308.

In a related embodiment, the dispensing unit 118b is located proximate a grain conveyance apparatus 310 designed to remove harvested grain from the harvesting vehicle. FIG. 3, for example, depicts a harvesting vehicle 302 in the process of transferring harvested grain 304 to a trailer 312. In this embodiment, identification markers 306 are dispensed into the grain 304 as it is transferred via the conveyance apparatus 310 to the trailer 312.

Figure 4:
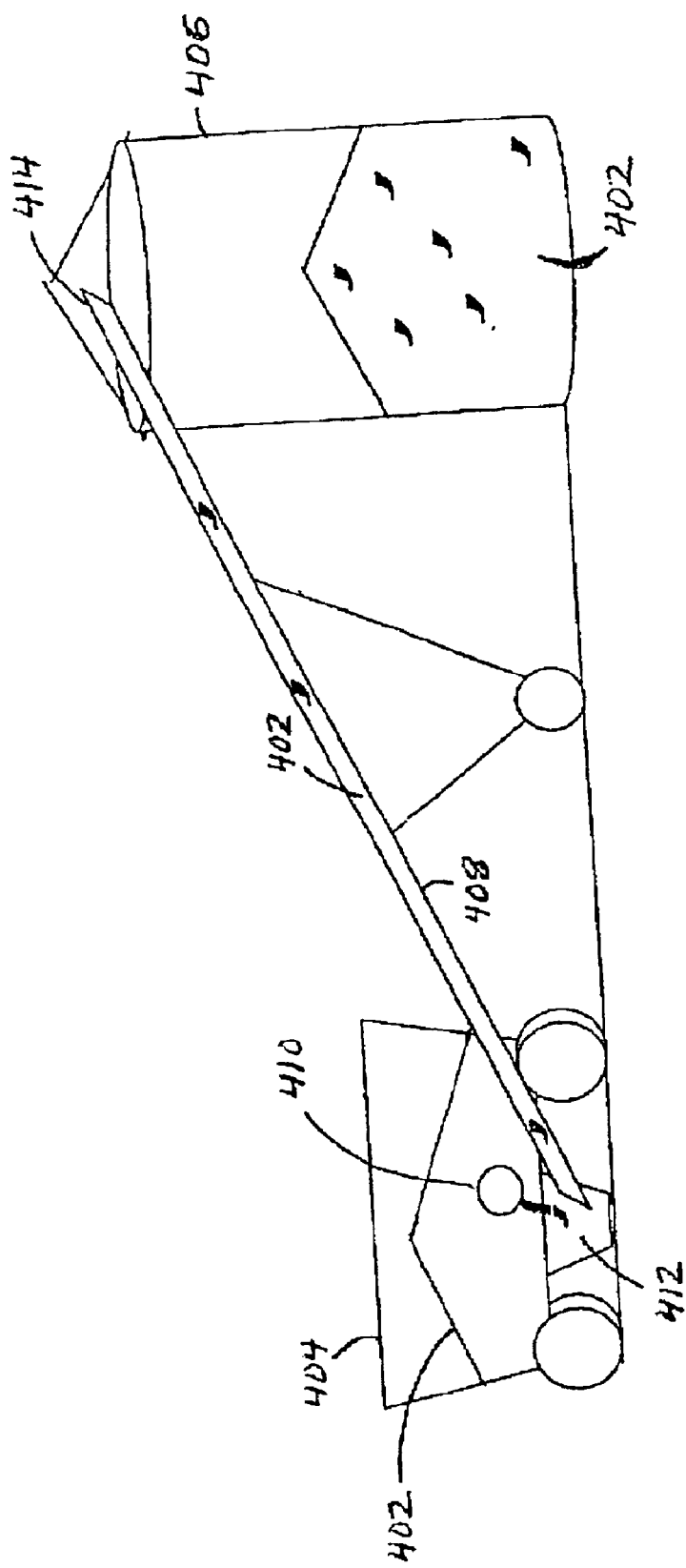
FIG. 4 is a graphical depiction of a storage-stage embodiment of the marker dispensing system of the present invention.

FIG. 4 depicts a trailer-mounted dispensing unit and system. In FIG. 4, the harvested grain 402 is in the process of being transferred from a trailer unit 404 to a storage bin 406 via a conveyor 408. In this embodiment, the dispensing system 410 is located proximate the grain outflow 412 of the trailer 404. The identification markers are dispensed into the grain 402 as it exits the trailer 404. In a related alternative embodiment, the marker dispensing system is located proximate the conveyor 408 or proximate the end 414 of the conveyor 408 where the grain 402 enters the storage bin 406.

Figure 5:
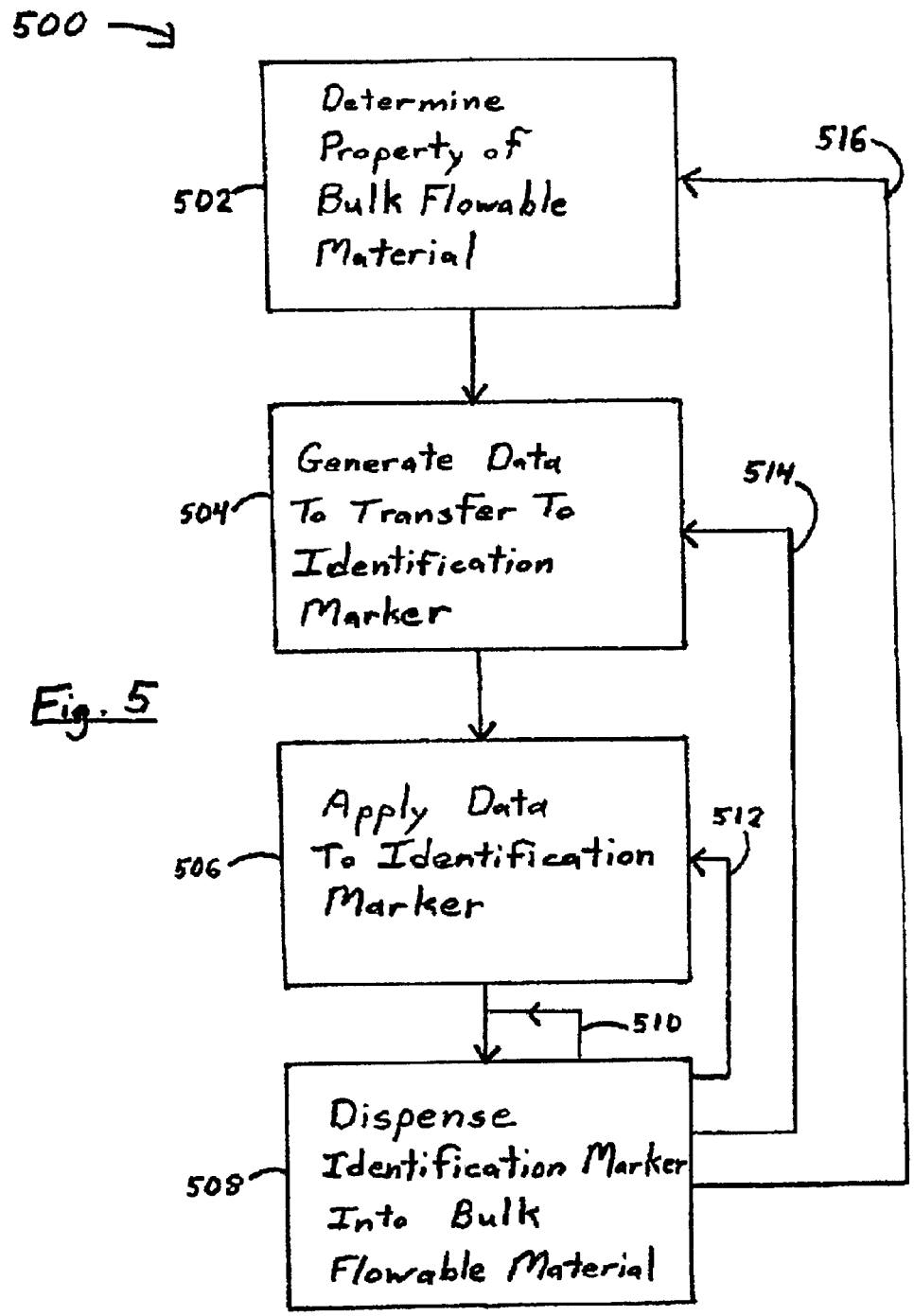
FIG. 5 is a flowchart depiction of an embodiment of a procedure that can be used to implement the present invention.

FIG. 5 is a flowchart 500 depicting the general steps and alternatives associated with an embodiment of the present invention. First, the property or properties associated with the bulk flowable material are determined 502. (Note, however, that in an embodiment wherein markers with sensors are dispensed, the step 502 can be performed after the step of dispensing.) Second, the data to be transferred to the identification marker is generated 504. Third, the generated data is applied to the identification marker 506. Fourth, an identification marker is dispensed into the bulk flowable material 508.

After the first marker is dispensed 508, several alternatives are available. If pre-prepared markers are being used, the dispensing step 508 is repeated as necessary 510. As disclosed above, several different types of indicators can be used to trigger a release of a marker. If the identification markers are not pre-prepared, the step of transferring data 506 to the marker is repeated 512 and markers are dispensed 508. This loop 512 is repeated as necessary in accord with the teachings herein.

If the data to be transferred to the marker can change, then control passes 514 to the step of generating the data 504 after each marker is dispensed. This can occur, for example, when a harvesting machine moves to a location where the bulk flowable material is known in advance to have a different or additional property. If the presence of a property can be sensed in real time, then control returns 516 to the step of determining the property 502 after each marker or group of markers is dispensed 508. This can occur, for example, when a harvesting machine contains a real time property sensor component that senses a property as the material is being harvested.

Figure 6:
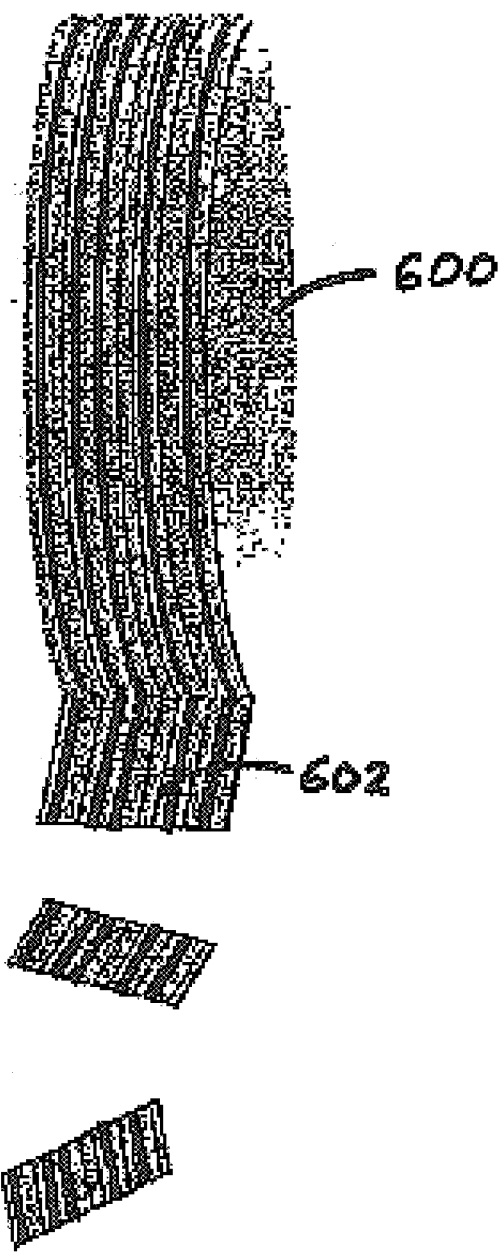
FIG. 6 is a graphical depiction of a preprinted identification marker that can be used in an embodiment of the present invention.

FIG. 6 depicts a roll 600 of a preprinted identification marker appropriate for use with one embodiment of the present invention. The roll 600 contains a single bar code 602. The bar code 602 is chosen to communicate information concerning a property or properties of the bulk material being marked. For instance, the bar code may identify one or more of the properties described herein, such as the variety, the seed source, the location or the owner of the bulk flowable material. The bar code runs for a substantial length of the roll. The orientation of the bar code in this longitudinal manner permits markers to be created and dispensed by slicing or cutting off a portion of the roll 600 at the appropriate time. This orientation also enables the creation of a maximal number of labels from the roll of media.

Pre-prepared markers, such as those of FIG. 6 or any of the other described embodiments, can be supplied by seed companies or other processors for example. Such pre-prepared markers can identify the seed variety, the seed buyer or farmer, and/or other information. The markers can be delivered at the time the seed is delivered or at the time of harvest for example.

In a related embodiment, a roll of blank marker media, similar to the roll of FIG. 6 but without the pre-printed bar code, is used in conjunction with a printer located in the dispensing unit. The printer is designed to print the lines necessary to depict a bar code or other similar optical indicia. The printer receives signals telling it which lines to print. The lines or other similarly continuous code are then printed on the blank roll of media in a longitudinal fashion such as is depicted in FIG. 6. This system has the advantage of added flexibility. A simple system can still be employed, but the property-related information, the bar code or bar code-like structure, can be changed without replacing the roll of marker media.

Figure 7:
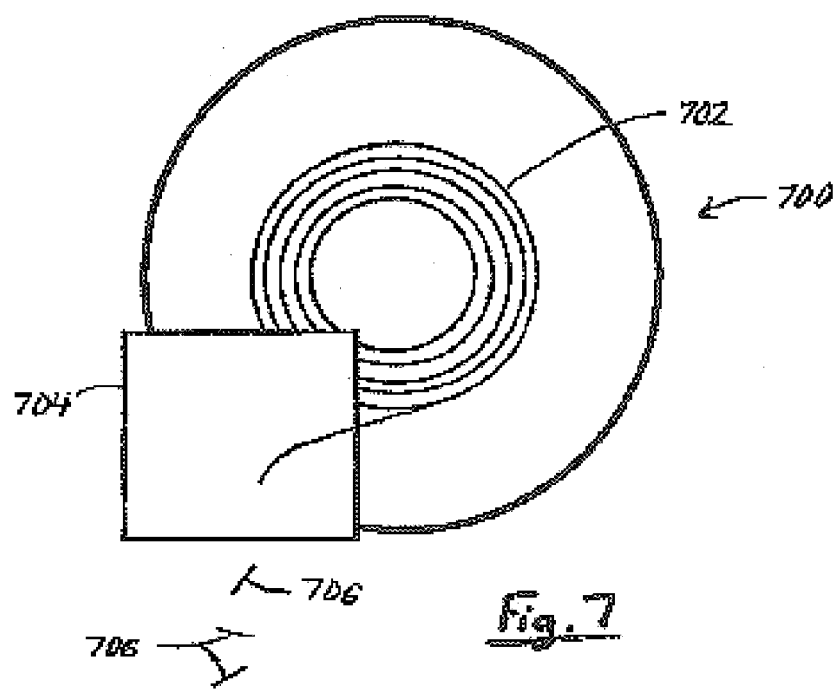
FIG. 7 is a side view graphical depiction of a marker dispenser that can be used in an embodiment of the present invention.
Figure 8:
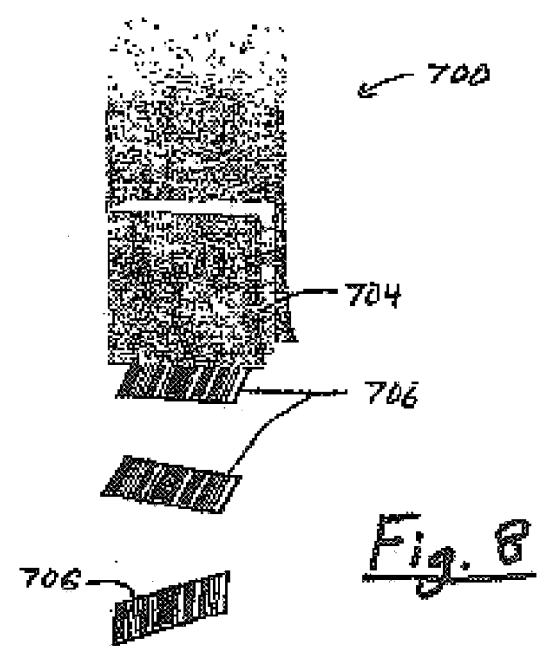
FIG. 8 is a graphical depiction of a frontal view of the marker dispenser of FIG. 7.

FIG. 7 depicts one embodiment of a dispenser unit 700 appropriate for use with the present invention. This embodiment includes a roll of marker media 702 that can be either pre-printed or at least partially incomplete. A feeding component 704 is depicted proximate the roll 702 and three identification markers 706 are depicted exiting the feeding component 704. In an embodiment using partially incomplete marking media, the dispenser unit 700 includes a printer or other suitable marker preparation component. FIG. 8 provides a frontal view of the dispenser unit 700 of FIG. 7 showing bar code identification markers 706 exiting the feeding component 704.

Figure 9:
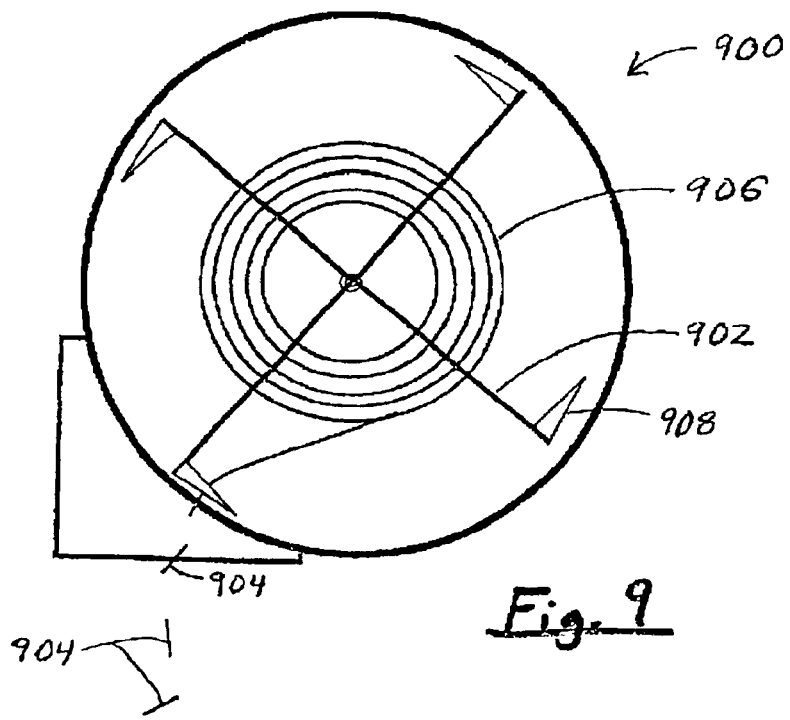
FIG. 9 is a graphical depiction of an interior view of the marker dispenser of FIG. 7 including one embodiment of a cutting mechanism.

FIG. 9 depicts an embodiment of a dispensing unit 900 having a cutting apparatus 902 for separating identification markers 904 from a roll of marker media 906. The cutting apparatus 902 contains one or more knife or blade components 908 that rotate with the roll 906. As the blade or blades rotate they separate lengths of media from the roll 906 which are then dispensed.

Figure 10:
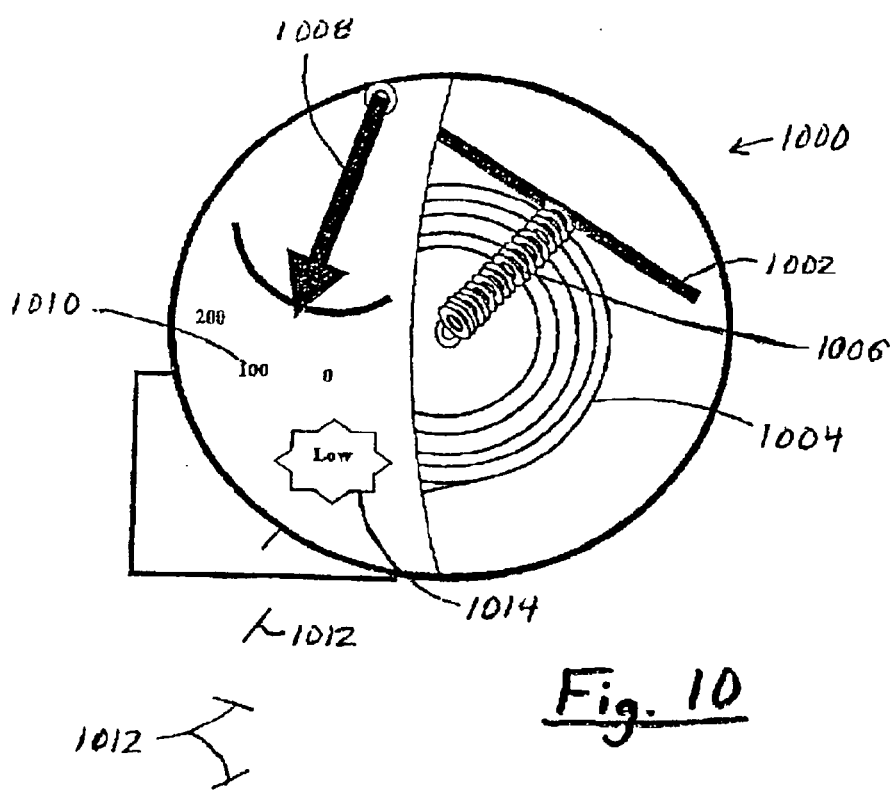
FIG. 10 is a graphical depiction of a marker dispenser including a marker supply indicator.

FIG. 10 depicts a cutaway view of an embodiment of a dispensing unit 1000 containing a marker supply indicator. The dispensing unit 1000 includes an arm or plate 1002, which is biased against a roll of marker media 1004 by a spring 1006. An indicator 1008 is coupled with the interior bar 1002. As the roll 1004 is depleted the interior bar 1002 moves and in turn moves the indicator 1008. A scale 1010 is located proximate the indicator 1008 to indicate the number of markers 1012 that can be dispensed. Alternatively or additionally, the dispenser unit 1000 includes a visual or aural indicator 1014 to signal when the media is depleted or nearly depleted. In a related embodiment, the depletion signal is sent to a remote location such as a harvester cab or other operator station.

Figure 11:
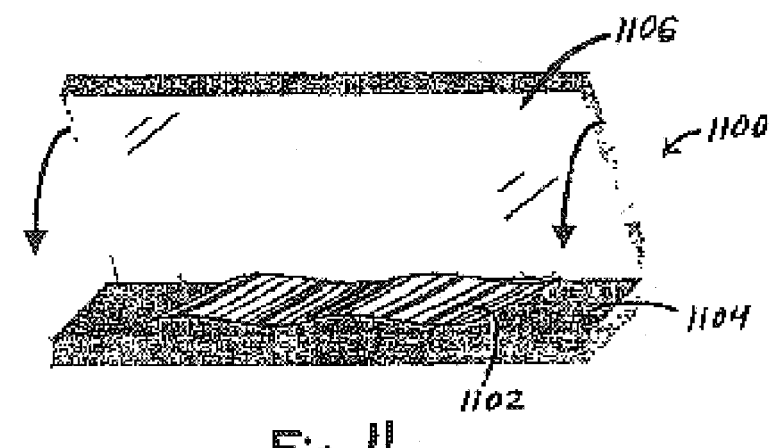
FIG. 11 is a graphical depiction of a reading component of the present invention.

FIG. 11 depicts a label reading apparatus 1100. In an embodiment using deformable or bendable media such as paper labels or the like, there may be a need to flatten the label to improve readability. In particular, long labels or narrow labels may be difficult to image and read. FIG. 111 depicts a label 1102 that has been placed on a receiving surface 1104 of the apparatus. The label reading apparatus 1100 also has a cover 1106 that is lowered against the receiving surface 1104 to flatten the label 1102.

Figure 12:
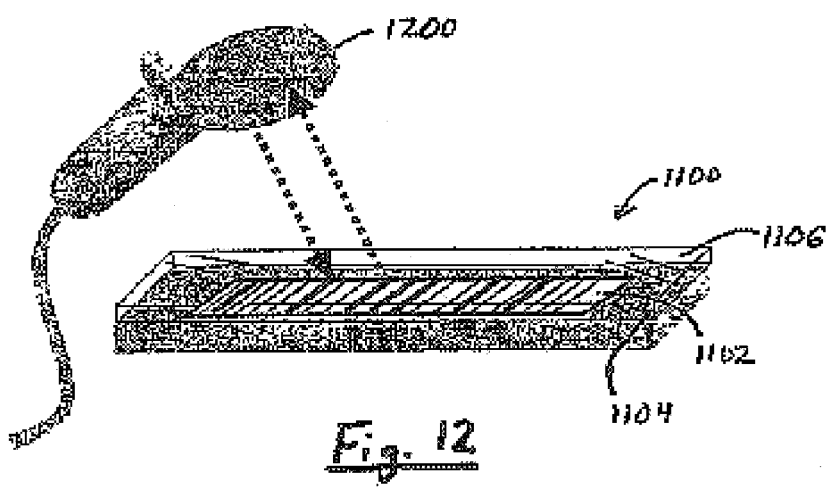
FIG. 12 is a graphical depiction of a reading operation involving the reading component of FIG. 11.

FIG. 12 depicts the label reading apparatus 1100 of FIG. 11 being used by an optical reader 1200 to read the label 1102. By flattening the label, the label reading apparatus 1100 enables a less expensive or less complex reading device to be used. It is not necessary to use a device capable of reading and decoding a curved label. Further, some labels may be curved to such an extent that they are unreadable unless flattened. The apparatus of FIGS. 11 and 12 can be used at any bulk flowable material handling stage requiring optical imaging of curved or bent labels.

It will be apparent to one of ordinary skill in the art that the details presented above are beyond what is necessary to practice the present invention. It is thought that the method and apparatus of the present invention will be understood from the preceding description and the appended claims, and that it will be apparent that various changes may be made in the form, construct steps and arrangement of the parts and steps thereof, without departing from the spirit and scope of the invention and without sacrificing the material advantages thereof.

As is evident from the description provided above, the implementation of the present invention varies greatly depending on the circumstances surrounding the implementation. Many variations, implementations and combinations are envisioned and disclosed. The scope of the present invention is intended to cover all variations, omissions, substitutions and combinations which are and which may become apparent from the disclosed embodiments. The scope of the invention should be extended to the claimed invention and all of its equivalents.

What is claimed is:

1. A method for identifying a characteristic of a bulk flowable material, comprising the steps of:
    selecting a bulk flowable material having a determined property;
    causing said bulk flowable material to flow;
    storing information related to the bulk flowable material on a property identification marker, said storing step being performed concurrent with said step of causing the bulk flowable material to flow; and
    periodically dispensing a property identification marker into said bulk flowable material.

2. The method according to claim 1, wherein said bulk flowable material comprises an agricultural product.

3. The method according to claim 2, wherein said agricultural product comprises an unharvested agricultural product.

4. The method according to claim 2, wherein said agricultural product comprises an harvested agricultural crop.

5. The method according to claim 4, wherein said harvested agricultural crop is located in a transport container.

6. The method according to claim 4, wherein said harvested agricultural crop is located in a crop harvesting apparatus.

7. The method according to claim 4, wherein said harvested agricultural crop is located in a storage container.

8. The method according to claim 2, wherein said property identification marker contains information indicating a crop variety designation related to said agricultural product.

9. The method according to claim 2, wherein said property identification marker contains information indicating a specific trait associated with said agricultural product.

10. The method according to claim 2, wherein said property identification marker contains information useful for indicating whether said agricultural product is a genetically modified organism.

11. The method according to claim 2, wherein said property identification marker contains information indicating said agricultural product's genetic content.

12. The method of claim 2, wherein said property identification marker contains information identifying a soil amendment application performed to soil used to grow said agricultural product.

13. The method of claim 12, wherein said soil amendment application comprises a fertilizer application.

14. The method according to claim 1, wherein said property identification marker contains information identifying a grower of said bulk flowable material.

15. The method according to claim 1, wherein said property identification marker contains information identifying an owner of said bulk flowable material.

16. The method according to claim 1, wherein said property identification marker contains information indicating geographic origin of said bulk flowable material.

17. The method according to claim 1, wherein said property identification marker contains information indicating a genetic property of said bulk flowable material.

18. The method according to claim 1, wherein said property identification marker contains information indicating a historical record of said bulk flowable material.

19. The method according to claim 1, wherein said property identification marker comprises an optically readable marker.

20. The method according to claim 19, wherein said optically readable marker comprises a machine-readable marker.

21. The method according to claim 19, wherein said optically readable marker comprises coded information.

22. The method according to claim 19, wherein said optically readable marker comprises human readable information.

23. The method according to claim 1, wherein said property identification marker comprises a radiant energy marker.

24. The method according to claim 23, wherein said radiant energy marker comprises a radio frequency identification tag.

25. The method according to claim 23, wherein said radiant energy marker contains identifying information stored prior to said step of causing said bulk flowable material to flow.

26. The method according to claim 1, further comprising a marker preparation step wherein identifying information is stored on said property identification marker, said marker preparation step being performed prior to said step of causing said bulk flowable material to flow.

27. The method according to claim 1, wherein said storing step is also performed after said step of periodically dispensing.

28. The method according to claim 1, wherein said property identification marker comprises information indicating a plurality of properties of said bulk flowable material.

29. The method according to claim 1, wherein said property identification marker comprises a colored-coded marker.

30. The method according to claim 1, wherein said property identification marker comprises a preprinted label.

31. The method according to claim 1, wherein said step of periodically dispensing is performed at pre-determined time intervals.

32. The method according to claim 1, wherein said step of periodically dispensing is performed at pre-determined volume-related intervals.

33. The method according to claim 1, wherein said property identification marker comprises a substance deposited onto said bulk flowable material.

34. The method according to claim 33, wherein said substance comprises a colored vegetable-based dye.

35. The method according to claim 1, wherein said property identification marker comprises a paper label.

36. The method according to claim 1, wherein said property identification marker comprises a biodegradable label.

37. The method according to claim 1, wherein said property identification marker consists of a biodegradable ink.

38. The method according to claim 37, wherein said biodegradable ink consists of a soy-based ink.

39. The method according to claim 1, further comprising the step of removing said property identification marker from said bulk flowable material.

40. The method according to claim 39, wherein said removing step comprises a filtering step.

41. The method according to claim 39, wherein said removing step comprises an air flow generating step.

42. The method according to claim 39, wherein said removing step comprises a gravity separation step.

43. The method according to claim 39, wherein said removing step comprises a magnetic separating step.

44. The method according to claim 1, further comprising a marker reading step.

45. The method according to claim 44, further comprising a routing step wherein said bulk flowable material is routed to a location based on data obtained in said reading step.

46. The method of claim 44, wherein said reading step is performed automatically.

47. The method of claim 46, further comprising the step of routing the bulk flowable material based on a determined property of the bulk flowable material.

48. The method of claim 47, wherein said routing step comprises the step of automatically routing the bulk flowable material in response to data gathered via said automatic reading step.

49. The method of claim 48, wherein said step of automatically routing further comprises the step of automatically directing bulk flowable material sharing a given determined property to a designated storage location.

50. The method of claim 49, wherein said step of automatically routing directs genetically modified bulk flowable material to a storage location collecting genetically modified bulk flowable material so as to segregate said genetically modified bulk flowable material from bulk flowable material that has not been genetically modified.

51. The method of claim 50, wherein said step of automatically routing further comprises the step of automatically directing bulk flowable material sharing a given determined property to a designated treatment location.

52. The method according to claim 1, wherein said periodically dispensing step is performed by a marker dispenser located in a bulk flowable material collection device.

53. The method according to claim 52, wherein said bulk flowable material collection device comprises a crop harvester.

54. The method according to claim 1, wherein said property identification marker contains information indicating a prior chemical treatment of said bulk flowable material.

55. The method according to claim 54, wherein said prior chemical treatment comprises an insecticide application.

56. The method according to claim 54, wherein said prior chemical treatment comprises a herbicide treatment.

57. The method according to claim 1, wherein said property identification marker contains information indicating future handling regarding said bulk flowable material.

58. The method according to claim 1, wherein said property identification marker contains information indicating prior testing of said bulk flowable material.

59. The method according to claim 1, further comprising the step of recording positioning information associated with said bulk flowable material.

60. The method according to claim 59, wherein said recording step includes the step of receiving a positioning system signal related to said bulk flowable material.

61. The method according to claim 1, wherein said property identification marker comprises a shape-coded marker.

62. The method according to claim 1, wherein said property identification marker comprises an edible marker.

63. The method of claim 1, wherein said property identification marker is made of biodegradable material.

64. The method of claim 1, wherein said property identification marker is physically attached to a portion of said bulk flowable material.

65. The method of claim 1, further comprising the step of sensing the volume of the flowing bulk flowable material, and wherein said periodically dispensing step dispenses a property identification marker so as to achieve a given property identification marker to volume ratio.

66. The method of claim 65, further comprising the steps of:
reading a dispensed property identification marker; and
using data obtained via the reading step to calculate statistical information related to the bulk flowable material.

67. The method of claim 65, further comprising the steps of:
reading a dispensed property identification marker; and
using data obtained via the reading step to calculate the bulk flowable material's volume.

68. The method of claim 1, further comprising the step of sensing the mass of the flowing bulk flowable material, and wherein said periodically dispensing step dispenses a property identification marker so as to achieve a given property identification marker to mass ratio.

69. The method of claim 68, further comprising the steps of:
reading a dispensed property identification marker; and
using data obtained via the reading step to calculate statistical information related to the bulk flowable material.

70. The method of claim 68, further comprising the steps of:
reading a dispensed property identification marker; and
using data obtained via the reading step to calculate the bulk flowable material's mass.

71. The method of claim 1, further comprising the step of sensing the weight of the flowing bulk flowable material, and wherein said periodically dispensing step dispenses a property identification marker so as to achieve a given property identification marker to weight ratio.

72. The method of claim 71, further comprising the steps of:
reading a dispensed property identification marker; and
using data obtained via the reading step to calculate statistical information related to the bulk flowable material.

73. The method of claim 71, further comprising the steps of:
reading a dispensed property identification marker; and
using data obtained via the reading step to calculate the bulk flowable material's weight.

74. The method of claim 1, further comprising the step of routing the bulk flowable material based on a determined property of the bulk flowable material.

75. A material identification system, comprising:
a plurality of property identification markers;
an automated marker dispenser capable of periodically dispensing said plurality of property identification markers into a flowing bulk flowable material; and
a property identification marker preparation component capable of associating information with said plurality of property identification markers while said automated marker dispenser periodically dispenses property identification markers into a flowing bulk flowable material;
wherein said plurality of property identification markers carry information identifying a physical characteristic of a bulk flowable material in which said property identification marker is placed.

76. The material identification system according to claim 75, wherein said plurality of property identification markers identifies a bulk flowable material as containing a genetically modified organism.

77. The material identification system according to claim 75, wherein said plurality of property identification markers identifies a bulk flowable material as containing an organism that has not been genetically modified.

78. The material identification system according to claim 75, wherein said plurality of property identification markers comprises a plurality of labels.

79. The material identification system according to claim 75, further comprising a preprinted continuous label spool which is subdivided to create said plurality of property identification markers.

80. The material identification system according to claim 79, wherein said preprinted continuous label spool comprises a continuous barcode printed thereon.

81. The material identification system according to claim 75, wherein said plurality of property identification markers comprises a plurality of optically readable markers.

82. The material identification system according to claim 81, wherein said plurality of optically readable markers comprises a human readable portion.

83. The material identification system according to claim 81, wherein said plurality of optically readable markers comprises a plurality of machine-readable markers.

84. The material identification system according to claim 81, wherein said plurality of optically readable markers contain coded information.

85. The material identification system according to claim 75, wherein said plurality of property identification markers comprises a plurality of radiant energy markers.

86. The material identification system according to claim 85, wherein said plurality of radiant energy markers comprises a plurality of radio frequency identification tags.

87. The material identification system according to claim 75, wherein each property identification marker of said plurality of property identification markers contains information identifying a plurality of characteristics of a bulk flowable material.

88. The material identification system according to claim 75, wherein said plurality of property identification markers is biodegradable.

89. The material identification system according to claim 75, wherein said plurality of property identification markers is consumable.

90. The material identification system according to claim 75, wherein said plurality of property identification markers consists of a plurality of ink doses.

91. The material identification system according to claim 75, wherein said plurality of property identification markers consists of a plurality of biodegradable ink doses.

92. The material identification system according to claim 75, wherein said plurality of property identification markers comprises a plurality of soy-based ink doses.

93. The material identification system according to claim 75, wherein said plurality of property identification markers comprises a plurality of colored marker doses.

94. The material identification system according to claim 75, wherein said plurality of property identification markers comprises a plurality of colored, vegetable-based dye doses.

95. The material identification system according to claim 75, wherein said plurality of property identification markers contains information identifying a soil amendment application performed to soil used to grow an agriculturally generated bulk flowable material.

96. The material identification system according to claim 95, wherein said plurality of property identification markers contains information identifying a fertilizer application as the soil amendment application.

97. The material identification system according to claim 75, wherein said plurality of property identification markers contains information identifying a pesticide application administered to an agriculturally generated bulk flowable material.

98. The material identification system according to claim 75, further comprising a bulk flowable material conveying apparatus.

99. The material identification system according to claim 75, further comprising a bulk flowable material routing apparatus.

100. The material identification system according to claim 75, further comprising an automatic bulk flowable material routing apparatus.

101. The material identification system according to claim 75, further comprising a property identification marker reading apparatus.

102. The material identification system according to claim 75, further comprising an automatic property identification marker reading apparatus.

103. A method of indicating whether a bulk flowable material contains a genetically modified organism, comprising the steps of:
  causing a harvested bulk flowable material to flow;
  preparing a property identification marker by associating identification data with the property identification marker, said preparing step being performed concurrent with said causing step; and
  dispensing a plurality of readily-identifiable property identification markers into the flowing bulk flowable material to indicate whether the harvested bulk flowable material contains a genetically modified organism.

104. The method of claim 103, further comprising the step of harvesting an unharvested bulk flowable material.

105. The method of claim 104, wherein said dispensing step is performed at generally the same time as said harvesting step.

106. The method of claim 103, further comprising the step of:
  selecting a field containing a quantity of an unharvested bulk flowable material, at least a portion of the unharvested bulk flowable material being a genetically modified organism; and
  harvested the unharvested bulk flowable material from the selected field.

107. The method of claim 106, wherein said dispensing step is performed at a location removed from the field selected in said selecting step.

108. The method of claim 106, wherein said dispensing step is performed at the location of the field selected in said selecting step.

109. The method of claim 103, wherein the plurality of readily-identifiable property identification markers are human-readable property identification markers.

110. The method of claim 103, wherein the plurality of readily-identifiable property identification markers are machine-readable property identification markers.

111. The method of claim 103, wherein the plurality of readily-identifiable property identification markers are radio frequency identification markers.

112. The method of claim 103, wherein the presence of the plurality of readily-identifiable property identification markers in the harvested bulk flowable material indicates, without the need for further testing of the harvested bulk flowable material, the presence of a genetically modified organism.

113. The method of claim 103, wherein the plurality of readily-identifiable property identification markers also indicate an additional characteristic of the harvested bulk flowable material.

114. A method of identifying a genetic characteristic of a bulk flowable material, comprising the steps of:
  causing a harvested bulk flowable material to flow;
  preparing a property identification marker by associating identification data with the property identification marker, said preparing step being performed concurrent with said causing step; and
  dispensing a plurality of readily-identifiable property identification markers into the flowing harvested bulk flowable material to indicate a genetic characteristic of the harvested bulk flowable material that cannot be visually perceived by an unaided human eye.

115. The method of claim 114, further comprising the step of harvesting an unharvested bulk flowable material, at least a portion of the unharvested bulk flowable material having a genetic characteristic that cannot be visually perceived by an unaided human eye.

116. The method of claim 114, further comprising the steps of:
  selecting a field containing a quantity of an unharvested bulk flowable material, at least a portion of the unharvested bulk flowable material having a genetic characteristic that cannot be visually perceived by an unaided human eye; and
  harvesting the unharvested bulk flowable material from the selected field.

117. The method of claim 114, wherein, in said dispensing step, said plurality of readily-identifiable property identification markers are dispensed to indicate whether a portion of the harvested bulk flowable material comprises a genetically modified organism.

118. The method of claim 114, wherein the presence of the plurality of readily-identifiable property identification markers in the harvested bulk flowable material indicates, without the need for further testing of the harvested bulk flowable material, whether the harvested bulk flowable material comprises a genetically modified organism.

119. The method of claim 114, wherein the plurality of readily-identifiable property identification markers also indicate an additional characteristic of the harvested bulk flowable material.

120. The method of claim 114, wherein the plurality of readily-identifiable property identification markers also indicate an environmental treatment that has been performed on an area from which the harvested bulk flowable material was harvested.

121. The method of claim 120, wherein the indicated environmental treatment comprises an application of a pesticide.

122. The method of claim 120, wherein the indicated environmental treatment comprises an application of a herbicide.

123. The method of claim 120, wherein the indicated environmental treatment comprises an application of a fertilizer.

124. A method of associating an environmental treatment with a bulk flowable material, comprising the steps of:
  causing a harvested bulk flowable material to flow;
  storing information related to the harvested bulk flowable material on a readily-identifiable property identification marker, said storing step being performed concurrent with said causing step; and dispensing a plurality of readily-identifiable property identification markers into the flowing harvested bulk flowable material to indicate that a given environmental treatment has been performed on an area from which the bulk flowable material had been collected, the performance of the environmental treatment being not capable of visual detection by viewing the harvested bulk flowable material with an unaided human eye.

125. The method of claim 124, wherein the indicated environmental treatment comprises an application of a pesticide.

126. The method of claim 124, wherein the indicated environmental treatment comprises an application of a herbicide.

127. The method of claim 124, wherein the indicated environmental treatment comprises a soil amendment.

128. The method of claim 127, wherein the soil amendment comprises an application of a fertilizer.

129. The method of claim 124, wherein the plurality of readily-identifiable property identification markers also indicate an additional characteristic of the harvested bulk flowable material.

130. The method of claim 124, wherein the plurality of readily-identifiable property identification markers also indicate a genetic characteristic of the harvested bulk flowable material.

131. The method of claim 124, wherein the presence of the plurality of readily-identifiable property identification markers in the harvested bulk flowable material reduces the need for further testing of the harvested bulk flowable material to determine whether the harvested bulk flowable material has undergone an environmental treatment.

132. The method of claim 124, wherein the plurality of readily-identifiable property identification markers are machine-readable property identification markers.

133. The method of claim 124, wherein the plurality of readily-identifiable property identification markers are radio frequency identification markers.

134. A method of identifying a characteristic of a bulk flowable material in a manner that will travel with the bulk flowable material and that will reduce the need for subsequent testing of the bulk flowable material for presence of the characteristic, comprising the steps of:
  determining whether at least a portion of a chosen lot of a harvested bulk flowable material possesses a given characteristic;
  causing the chosen lot of harvested bulk flowable material to flow;
  storing information related to the chosen lot on a property identification marker, said storing step being performed concurrent with said causing step; and
  periodically dispensing a property identification marker into the flowing bulk flowable material;
  wherein presence of the property identification marker in the harvested bulk flowable material reduces the need for further testing of the chosen lot of harvested bulk flowable material to determine whether the given characteristic is present in the chosen lot.

135. The method of claim 134, further comprising the steps of:
  selecting a field containing a quantity of an unharvested bulk flowable material; and
  harvesting thy unharvested bulk flowable material from the selected field;
  wherein, in said dispensing step, the property identification marker is dispensed into the flowing bulk flowable material without regard to the specific harvest point within the boundaries of the selected field from which the bulk flowable material has been harvested.

136. The method of claim 134, wherein the property identification marker comprises human-readable information.

137. The method of claim 134, wherein the property identification marker comprises machine-readable information.

138. The method of claim 134, wherein the property identification marker comprises a radio frequency identification marker.

139. The method of claim 134, wherein the determined given characteristic comprises a genetic characteristic.

140. The method of claim 134, wherein the determined given characteristic comprises an exposure of the area from which the harvested bulk flowable material was harvested to an environmental treatment, the environment treatment having been performed prior to harvesting of the harvested bulk flowable material.

141. The method of claim 134, wherein the property identification marker also indicates additional characteristic of the harvested bulk flowable material.

142. The method of claim 141, wherein the indicated additional characteristic of the harvested bulk flowable material comprises ownership information related to the harvested bulk flowable material.

143. The method of claim 141, wherein the indicated additional characteristic of the harvested bulk flowable material comprises origin information related to the harvested bulk flowable material.

144. A method of harvesting and identifying a characteristic of a bulk flowable material containing a genetically modified organism, comprising the steps of:
  selecting a field containing a quantity of a bulk flowable material, at least a portion of the bulk flowable material being a genetically modified organism;
  harvesting the bulk flowable material from the selected field;
  causing the harvested bulk flowable material to flow;
  storing information related to the bulk flowable material on a property identification marker, said storing step being performed concurrent with said causing step; and
  dispensing, without regard to location within the selected field, a plurality of readily-identifiable property identification markers into the flowing bulk flowable material to indicate that the harvested bulk flowable material contains a genetically modified organism.

145. A method for indicating a characteristic of a bulk flowable material, comprising the steps of:
  selecting a bulk flowable material having a determined property;
  causing the bulk flowable material to flow;
  preparing a property identification marker by associating data with the property identification marker, said preparing step being performed concurrent with said causing step; and
  periodically dispensing a prepared property identification marker into the bulk flowable material.

146. The method according to claim 145, wherein the property identification marker contains information identifying a grower of the bulk flowable material.

147. The method according to claim 145, wherein the property identification marker contains information identifying an owner of the bulk flowable material.

148. The method according to claim 145, wherein the property identification marker contains information indicating geographic origin of the bulk flowable material.

149. The method according to claim 145, wherein the property identification marker contains information indicating a genetic property of the bulk flowable material.

150. The method according to claim 145, wherein the property identification marker contains information indicating a historical record of the bulk flowable material.

151. The method according to claim 145, wherein the bulk flowable material comprises an agricultural product, and wherein the property identification marker contains information indicating a crop variety designation related to the agricultural product.

152. The method according to claim 145, wherein the bulk flowable material comprises an agricultural product, and wherein the property identification marker contains information indicating a specific trait associated with the agricultural product.

153. The method according to claim 145, wherein the bulk flowable material comprises an agricultural product, and wherein the property identification marker contains information useful for indicating whether the agricultural product is a genetically modified organism.

154. The method according to claim 145, wherein the bulk flowable material comprises an agricultural product, and wherein the property identification marker contains information indicating the agricultural product's genetic content.

155. The method according to claim 145, wherein the property identification marker comprises information indicating a plurality of properties of the bulk flowable material.

156. The method according to claim 145, wherein the property identification marker contains information indicating a prior chemical treatment of the bulk flowable material.

157. The method according to claim 156, wherein the prior chemical treatment comprises an insecticide application.

158. The method according to claim 156, wherein the prior chemical treatment comprises a herbicide treatment.

159. The method according to claim 145, wherein the property identification marker contains information indicating future handling regarding the bulk flowable material.

160. The method according to claim 145, wherein the property identification marker contains information indicating prior testing of the bulk flowable material.

161. The method according to claim 145, further comprising the step of recording positioning information associated with the bulk flowable material.

162. The method according to claim 145, wherein the property identification marker comprises a radiant energy marker.

163. The method according to claim 145, wherein the property identification marker comprises an optically readable marker.

164. A method for indicating a characteristic of a bulk flowable material, comprising the steps of:
    causing a bulk flowable material to flow;
    periodically dispensing a property identification marker into the bulk flowable material; and
    storing information related to the bulk flowable material on a property identification marker, said storing step being performed after said periodically dispensing step.

165. The method according to claim 164, wherein the property identification marker contains information identifying a grower of the bulk flowable material.

166. The method according to claim 164, wherein the property identification marker contains information identifying an owner of the bulk flowable material.

167. The method according to claim 164, wherein the property identification marker contains information indicating geographic origin of the bulk flowable material.

168. The method according to claim 164, wherein the property identification marker contains information indicating a genetic property of the bulk flowable material.

169. The method according to claim 164, wherein the property identification marker contains information indicating a historical record of the bulk flowable material.

170. The method according to claim 164, wherein the bulk flowable material comprises an agricultural product, and wherein the property identification marker contains information indicating a crop variety designation related to the agricultural product.

171. The method according to claim 164, wherein the bulk flowable material comprises an agricultural product, and wherein the property identification marker contains information indicating a specific trait associated with the agricultural product.

172. The method according to claim 164, wherein the bulk flowable material comprises an agricultural product, and wherein the property identification marker contains information useful for indicating whether the agricultural product is a genetically modified organism.

173. The method according to claim 164, wherein the bulk flowable material comprises an agricultural product, and wherein the property identification marker contains information indicating the agricultural product's genetic content.

174. The method according to claim 164, wherein the property identification marker comprising information indicating a plurality of properties of the bulk flowable material.

175. The method according to claim 164, wherein the property identification marker contains information indicating a prior chemical treatment of the bulk flowable material.

176. The method according to claim 175, wherein the prior chemical treatment comprises an insecticide application.

177. The method according to claim 175, wherein the prior chemical treatment comprises a herbicide treatment.

178. The method according to claim 164, wherein the property identification marker contains information indicating future handling regarding the bulk flowable material.

179. The method according to claim 164, wherein the property identification marker contains information indicating prior testing of the bulk flowable material.

180. The method according to claim 164, wherein the property identification positioning information associated with the bulk flowable material.

181. The method according to claim 164, wherein the property identification marker comprises a radiant energy marker.

182. The method according to claim 164, wherein the property identification marker comprises an optically readable marker.

183. A property indication apparatus, comprising:
    means for causing indicating a property of a bulk flowable material;
    means for causing a bulk flowable material to flow;
    means for preparing said means for identifying a property by associating identification data with said means for identifying a property, and
    means for periodically dispensing said means for indicating a property into a flowing bulk flowable material;
    wherein said means for preparing operates concurrent with said means for causing a bulk flowable material to flow.

184. The property indication apparatus according to claim 183, wherein said means for indicating a property identifies a grower of the bulk flowable material.

185. The property indication apparatus according to claim 183, wherein said means for indicating a property identifies an owner of the bulk flowable material.

186. The property indication apparatus according to claim 183, wherein said means for indicating a property identifies geographic origin of the bulk flowable material.

187. The property indication apparatus according to claim 183, wherein said means for indicating a property identifies a genetic property of the bulk flowable material.

188. The property indication apparatus according to claim 183, wherein said means for indicating a property indicates a historical record of the bulk flowable material.

189. The property indication apparatus according to claim 183, wherein the bulk flowable material comprises an agricultural product, and wherein said means for indicating a property identifies a crop variety designation related to the agricultural product.

190. The property indication apparatus according to claim 183, wherein the bulk flowable material comprises an agricultural product, and wherein said means for indicating a property identifies a specific trait associated with the agricultural product.

191. The property indication apparatus according to claim 183, wherein the bulk flowable material comprises an agricultural product, and wherein said means for indicating a property identifies whether the agricultural product is a genetically modified organism.

192. The property indication apparatus according to claim 183, wherein the bulk flowable material comprises an agricultural product, and wherein said means for indicating a property identifies the agricultural product's genetic content.

193. The property indication apparatus according to claim 183, wherein said means for indicating a property identifies a plurality of properties of the bulk flowable material.

194. The property indication apparatus according to claim 183, wherein said means for indicating a property identifies a prior chemical treatment of the bulk flowable material.

195. The property indication apparatus according to claim 194, wherein the prior chemical treatment comprises an insecticide application.

196. The property indication apparatus according to claim 194, wherein the prior chemical treatment comprises a herbicide treatment.

197. The property indication apparatus according to claim 183, wherein said means for indicating a property identifies future handling regarding the bulk flowable material.

198. The property indication apparatus according to claim 183, wherein said means for indicating a property identifies prior testing of the bulk flowable material.

199. The property indication apparatus according to claim 183, wherein said means for indicating a property comprises an optically readable marker.

200. The property indication apparatus according to claim 199, wherein said optically readable marker comprises a machine-readable marker.

201. The property indication apparatus according to claim 199, wherein said optically readable marker comprises coded information.

202. The property indication apparatus according to claim 199, wherein said optically readable marker comprises human readable information.

203. The property indication apparatus according to claim 183, wherein said means for indicating a property comprises a radiant energy marker.

204. The property indication apparatus according to claim 203, wherein said radiant energy marker comprises a radio frequency identification tag.

205. A method for identifying a characteristic of a bulk flowable material, comprising the steps of:
   causing a bulk flowable material to flow;
   sensing a volume of the flowing bulk flowable material;
   periodically dispensing a property identification marker into the bulk flowable material, wherein said periodically dispensing step dispenses a property identification marker so as to achieve a given property identification marker to volume ratio;
   reading a dispensed property identification marker; and
   using data obtained via said reading step to calculate statistical information related to the bulk flowable material.

206. A method for identifying a characteristic of a bulk flowable material, comprising the steps of:
   causing a bulk flowable material to flow;
   sensing a volume of the flowing bulk flowable material;
   periodically dispensing a property identification marker into the bulk flowable material, wherein said periodically dispensing step dispenses a property identification marker so as to achieve a given property identification marker to volume ratio;
   reading a dispensed property identification marker; and
   using data obtained via said reading step to calculate the bulk flowable material's volume.

207. A method for identifying a characteristic of a bulk flowable material, comprising the steps of:
   causing a bulk flowable material to flow;
   sensing a mass of the flowing bulk flowable material;
   periodically dispensing a property identification marker into the bulk flowable material, wherein said periodically dispensing step dispenses a property identification marker so as to achieve a given property identification marker to volume ratio;
   reading a dispensed property identification marker; and
   using data obtained via said reading step to calculate statistical information related to the bulk flowable material.

208. A method for identifying a characteristic of a bulk flowable material, comprising the steps of:
   causing a bulk flowable material to flow;
   sensing a mass of the flowing bulk flowable material;
   periodically dispensing a property identification marker into the bulk flowable material, wherein said periodically dispensing step dispenses a property identification marker so as to achieve a given property identification marker to volume ratio;
   reading a dispensed property identification marker; and
   using data obtained via said reading step to calculate the bulk flowable material's mass.

209. A method for identifying a characteristic of a bulk flowable material, comprising the steps of:
   causing a bulk flowable material to flow;
   sensing a weight of the flowing bulk flowable material;
   periodically dispensing a property identification marker into the bulk flowable material, wherein said periodically dispensing step dispenses a property identification marker so as to achieve a given property identification marker to volume ratio;
   reading a dispensed property identification marker; and
   using data obtained via said reading step to calculate statistical information related to the bulk flowable material.

210. A method for identifying a characteristic of a bulk flowable material, comprising the steps of:
  causing a bulk flowable material to flow;
  sensing a weight of the flowing bulk flowable material;
  periodically dispensing a property identification marker into the bulk flowable material, wherein said periodically dispensing step dispenses a property identification marker so as to achieve a given property identification marker to volume ratio;
  reading a dispensed property identification marker; and
  using data obtained via said reading step to calculate the bulk flowable material's weight.

* * * * *